March 26, 1929.　　　J. ROBINSON　　　1,706,752

AUTOMATIC TRAIN PIPE CONNECTER

Original Filed April 2, 1921　　4 Sheets-Sheet 4

INVENTOR
Joseph Robinson
BY
Watson, Coit, Morse & Grindle
ATTORNEYS 1,706,752

Patented Mar. 26, 1929.

UNITED STATES PATENT OFFICE.

JOSEPH ROBINSON, OF NEW YORK, N. Y.

AUTOMATIC TRAIN-PIPE CONNECTER.

Application filed April 2, 1921, Serial No. 458,120. Renewed February 13, 1929.

My invention relates to improvements in automatic train pipe connecters and has among its objects to provide an improved means of coupling a car equipped with the automatic connecter into interchange communication with a car not so equipped. Another object of the invention is to provide a simple and efficient means for removing a defective gasket from between the faces of mated connecter heads while the cars remain coupled, and a still further object of my improvement is to provide a simple and efficient universal support for supporting the connecter from the car, which will permit the connecter head to be swung out of the normal position when it is desired to couple the connecter hose into interchange communication with the hose of a car not equipped with the automatic device.

One of the prime essentials to the success of an automatic connecter, especially in freight service, is that the hose of a car equipped with it must be capable of being readily connected into communication with the hose of a car not so equipped. The means heretofore employed to accomplish this end have invariably added considerable complication to the connecter proper, impairing its efficiency and objectionably adding to its cost of manufacture. In other instances such means has been formed separately of the connecter and attached thereto when interchange was desired. The objection to these forms of interchange devices is that they must be carried on some part of the car considerably removed from the automatic connecter thus necessitating that the trainmen go a considerable distance to procure the interchange device in order to couple the hose of the car equipped with the automatic connecter into communication with the hose of the unequipped car. In addition to the delay thus occurring, this type of interchange device frequently becomes lost, for, as is well known, it is almost impossible to insure any loose or detachable part of a freight car against loss. With my present improvement the interchange coupling is always with the connecter thus enabling a car equipped with the automatic connecter to be immediately coupled to one not so equipped. The arrangement is simple, does not add additional friction to the flow of the air from one car to the other, and adds practically no additional parts to the connecter. The objection heretofore encountered, that the hose leading from the connecter to the train pipe is too short to permit an interchange device which forms a part of the connecter proper being coupled into the hose of the unequipped car, is removed by my improved universal joint, the joint being so constructed that the coupling head of the connecter may be shifted out of the way when it is desired to make interchange.

With these and other objects in view my invention resides in the combinations, arrangement and constructions hereinafter described, pointed out in the appended claims, and illustrated in the accompanying drawings in which:—

Figure 3:
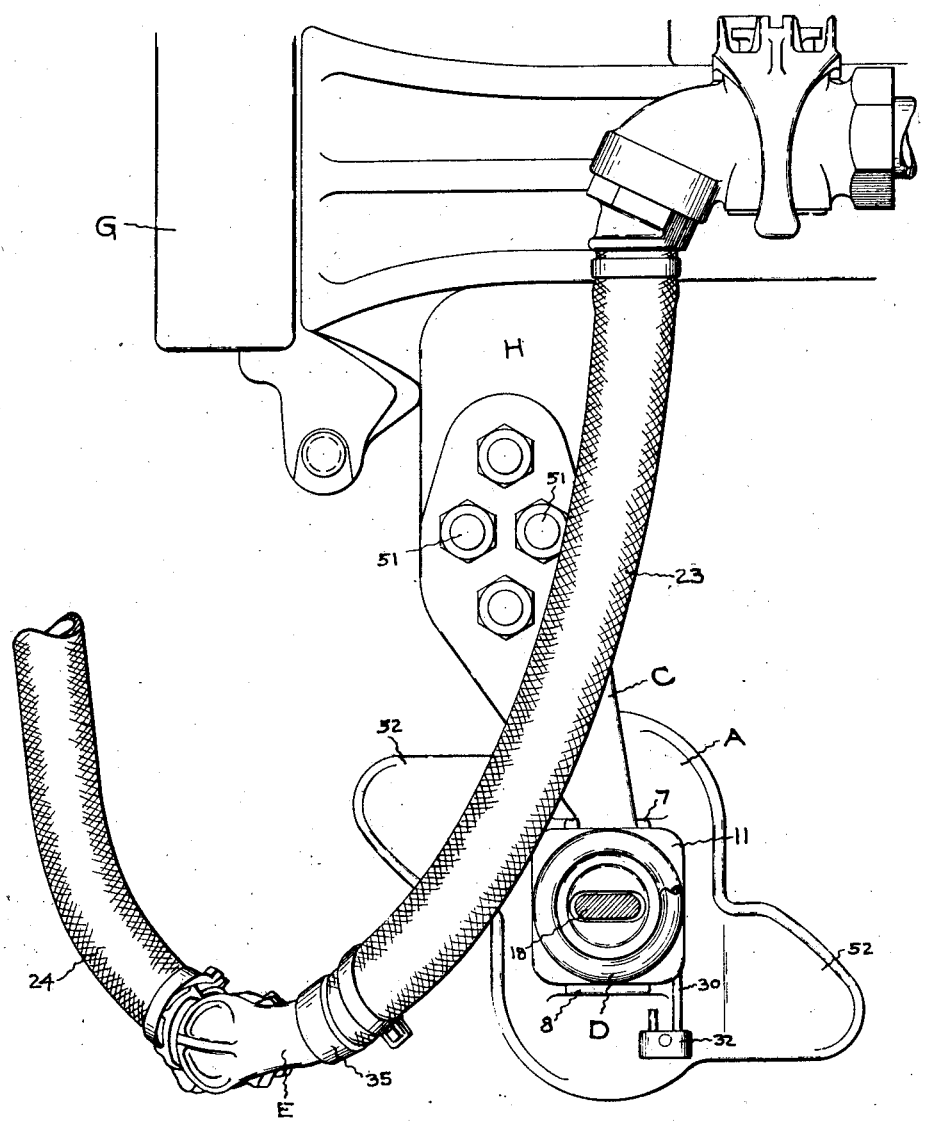

Figure 3 is a rear view of my improvement showing the spring D broken away and the tie rod 18 in section. In this view the automatic connecter is swung out of the way of the connecter hose 23 so as to permit this hose to be coupled into the hose 24 of the unequipped car, as shown.

Figure 1:
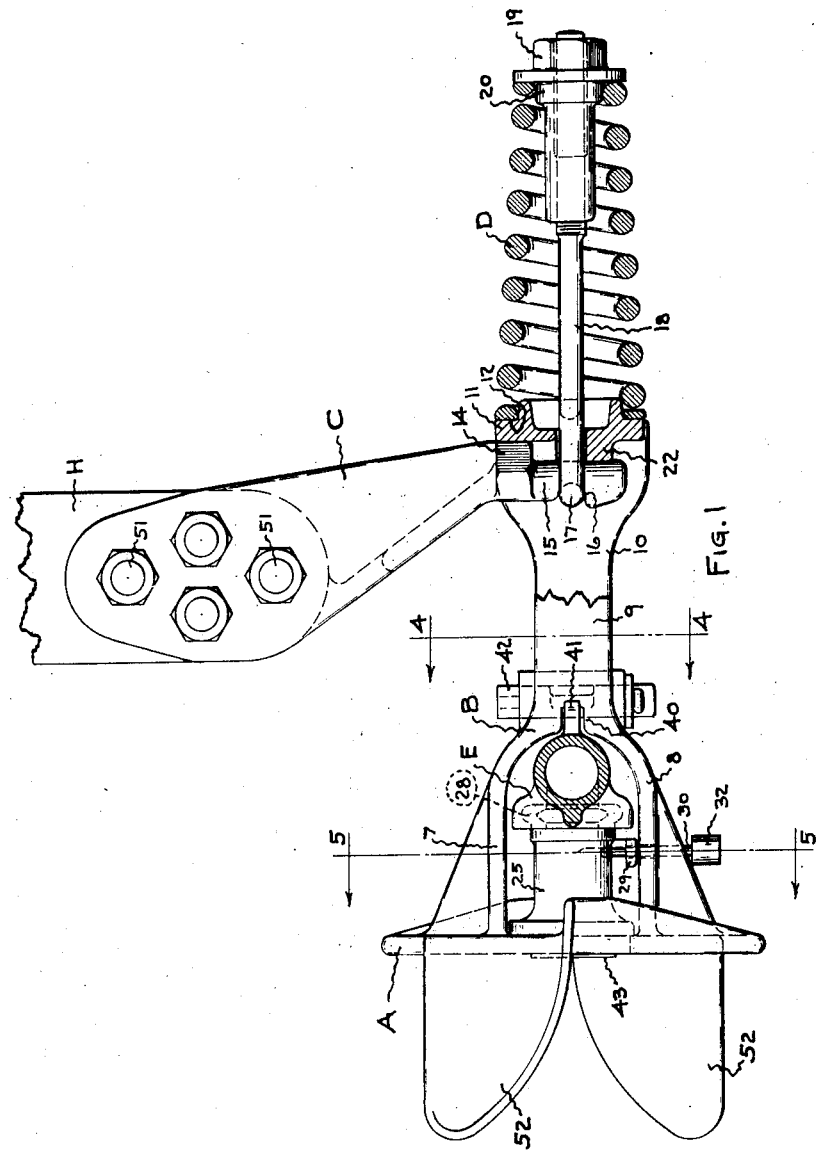
Figure 1 is a side elevation of my improvement showing the interchange coupling in transverse section, and showing a portion of the universal joint in vertical section. In this view the car coupler and hose shown in Figure 3, are omitted.
Figure 4:
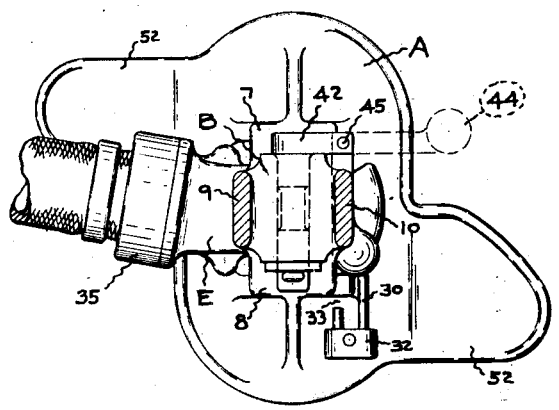

Figure 4 is a rear view of my improvement taken on the line 4—4 of Figure 1.

Figure 5:
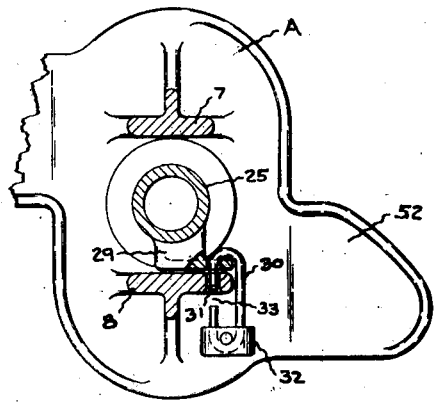

Figure 5 is a rear view thereof taken on the line 5—5 of Figure 1, and

Figure 6:
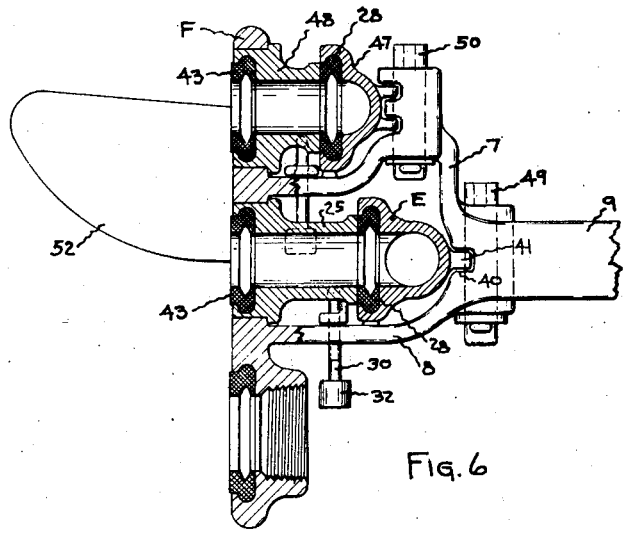

Figure 6 is a vertical section through an automatic connecter head of the passenger type, provided with my improvement.

Referring now to the drawings: My improvement comprises a coupling head A provision which may be either of the butt face wing type as shown or any other suitable design. A member or body B comprising spaced portions 7 and 8 lying one above the other, and spaced portions 9 and 10 lying on opposite sides of the longitudinal center line of said member and in the horizontal plane, is suitably connected to the head A. I preferably form the member integral with the head as shown. The rear ends of the portions 9 and 11

10 terminate in a vertically extending flange 11 perforated as shown particularly in Figures 1 and 3 and having on its rear face an annular seat or bearing 12. The flange has a V-shaped opening 13 in its upper portion, as shown particularly in Figure 2, which opening is adapted to receive a complementarily formed portion 14 of the bracket C. Extending downwardly from this portion 14 I provide a cylindrically formed projection 15 having a seat 16 in which is pivotally mounted the head or eye 17 of a tie rod or pivot device 18. The tie rod extends rearwardly through the perforation in the flange 11 and through a buffer spring D and carries at its rear end a nut or abutment 19 adjustably mounted on the tie rod and serving to confine the buffer spring D between the flange 11 and the annular bearing 20 on the said nut or abutment. By this arrangement the spring D is placed under the required initial compression to properly maintain the coupling head A in the normal horizontal coupling position. Immediately below the head 17 of the pivot device 18 I provide the flange 11 with a forwardly extending portion 22 which abuts the lower end of the vertically extending projection 15 to prevent the pressure of the buffer spring D unduly tilting the coupling head upwardly when in the uncoupled position.

Figure 2:
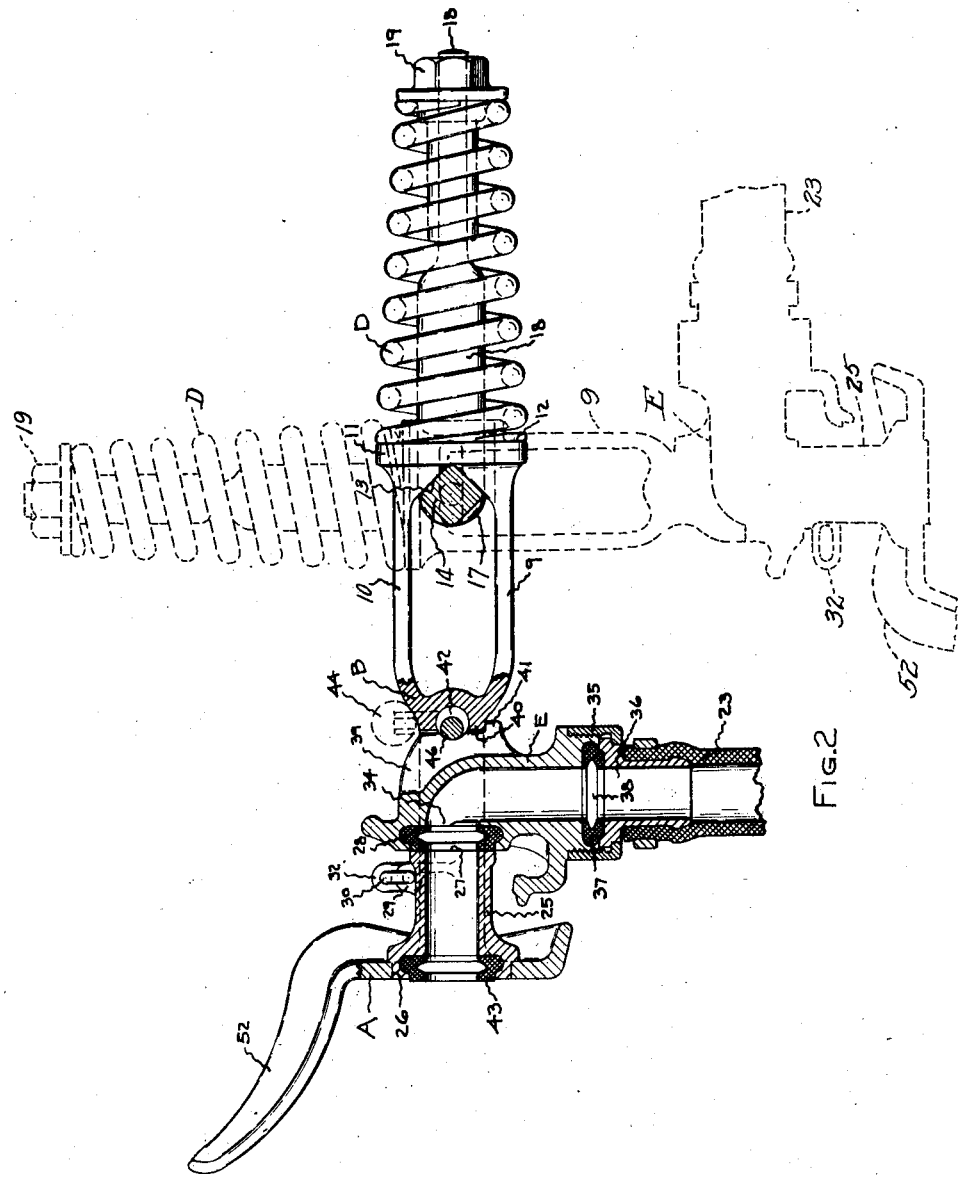
Figure 2 is a sectional plan view of my improvement showing in section the interchange device and the means for renewing defective gaskets. In this view the portion 15 of the bracket C which is engaged by the upper part of the flange 11 is also shown in section.

It will be observed that any movement of the coupling head A laterally from the normal position, shown in the Figures 1 and 2, will cause the flange 11 to ride along the inclined surface of the portion 14 of the bracket C, see especially Figure 2, against the tension of the buffer spring D. This movement will place the buffer spring under additional compression insuring that the head A will be returned to the normal position when the force tending to shift it laterally is removed. The force required to thus shift the coupling head is no more than an operator can readily exert by putting his foot against the connecter and giving it a shove. By this arrangement the connecter may be moved to a position at a right angle to the track, thus shifting the coupling head A out of the way and permitting ready connection of the hose 23 across to the hose 24 of the unequipped car—see Figure 3. It will be observed from Figure 2 that the pivot device 18 is of considerable width for quite a distance to the rear of the flange 11. This is to provide a wide bearing surface for the flange to rest upon, as it is by this means, and through the socket connection of the pivot device with the vertically extending portion 15 of the bracket C, that the connecter is supported on the bracket, especially when in the coupled position.

My improved gasket renewing means and interchange device consists of a nipple 25 loosely mounted in the perforation 26 of the coupling head A, and extending rearwardly therefrom as shown. The nipple is provided with a rear face 27 for engaging a gasket 28 carried in the head E of my improved interchange. A suitable foot 29 is provided on the nipple 25 to support it on the lower web 8 of the member B, a simple form of lock comprising a chain link 30 being inserted in the opening in the foot and projecting into a hole 31 formed in the lower web 8—see Figure 5. The link is weighted by a suitable weight 32 connected in any desired manner to the link 30. When the head E of my improved interchange is removed from the coupled position, the fitting 25 may be extracted from the coupling head A by lifting the link 30 upwardly until its weight 32 engages the underside of the lower web 8—see especially Figure 5. This will bring the opening 33 in the link in position to permit the foot 29 of the nipple or fitting 25 to be extracted therefrom either by swinging it laterally or by shifting the nipple rearwardly out of the coupling head A. This extraction of the nipple is of course effected only when the head E of my improved interchange is removed from out of the coupled position, shown in Figure 2. The said head E is, as respects its coupling contour, a duplicate of the present well known hand operated hose coupling. It is provided with a lateral opening 34 which, when the head is attached to the automatic connecter, points in the direction of the coupling head A, and when coupled to the hose 24 of a car not having the automatic connecter points in the opposite direction, as appears especially in Figures 2 and 3. This is made necessary by the fact that the opening in the present hand operated hose coupling leads from the face of such coupling in just the opposite direction to that shown in Figure 2 by my improved interchange head E. When it is desired to couple the interchange into the present hand operated coupling, the head E must be rotated to bring its opening 34 into alignment with the complementary opening in the hand operated coupling. To permit of this rotation I provide my improvement with a swivel joint comprising a collar or nut 35 rigidly screwed to the head E, and a fitting or nipple 36 rotatably connected to the head by the nut 35. To seal the joint between this nipple and the rear end of the head E, I provide a suitable gasket 37 having an interior annular groove 38 to admit the fluid pressure thereto, whereby the gasket is expanded into tight engagement with the head E and the nipple 36, thereby positively preventing any leak of the fluid at this joint. When the fluid pressure is absent, as in making interchange, the joint may be easily swivelled, while with the pressure on it is practically rigid.

To insure correct positioning of my improved interchange, with respect to the member B, I provide the head E with a rib 39 adapted to enter a groove 40 formed in the member B, which arrangement properly guides the head E into correct position, a shoulder 41 being formed on the web 39 to engage a side of the member B, as shown in Figure 2, to limit the inward movement of the head E. A cam, or other suitable locking device 42 extends vertically through the member B at the junction between the ribs 7, 8, 9 and 10 and serves to shift the head E of my improved interchange forward against the rear face 27 of this fitting 25, thus compressing the gasket 28 and insuring a tight joint between the head E and the fitting. By the same movement of the cam device 42 the fitting 25 is forced into rigid engagement with the coupling head A, and in case the interchange E has been removed from the connecter for the purpose of extracting the fitting 25 to replace a defective gasket, the cam device 42 will act, upon reassembly of the parts, to force the gasket 43, carried at the forward end of the fitting 25, into compressed position with the gasket of a mating coupling head A. It will be observed that a common form of gasket is used in the fitting, in the port opening 34 of my improved interchange E, and at the swivel joint formed by the head E, the nipple 36 and the nut 35. Thus the joint between the head E and the nipple 36 is sealed by the fluid pressure within these parts.

It will be observed also, particularly in Figures 2 and 4, that the cam device 42 is provided with a handle or weight 44 pivotally connected to the cam device as at 45 which handle serves both to facilitate shifting of the cam and to prevent accidental disconnection of the head E of my improved interchange from the service position. In Figure 2 the interchange is shown in the proper assembled and locked position with respect to the connecter, and the weighted handle 44 of the cam device 42 is shown normally pending downward and abutting a portion of the member B, by which engagement accidental shifting of the cam from the service position is prevented. When it is desired to break the joint between the head E of my improved interchange and the nipple or conduit 25, the weighted handle is lifted to the position shown in dotted lines in Figure 4 and is moved towards the bracket C of the connecter until the cam moves out of its recess 46, formed in the web 39 of the interchange E, whereupon the interchange may be removed from the connecter, see Figures 2 and 3. This done, it is but necessary to shift the coupling head A to a position crosswise of the track, as shown in Figure 3, to permit the interchange E to be coupled into the hose 24 of the unequipped car.

Figure 6 shows an ordinary type of butt face coupling head F provided with the required three vertically aligned openings to carry the signal air, brake air, and steam, the central port, and the uppermost port, of this head being provided with my improvement, as shown. The parts for this purpose are the same in this head as those shown in Figure 2, except that the interchange head 47 and the nipple 48 in the uppermost port are of slightly less dimension than the corresponding parts operating in the central port of the head F. Cams 49 and 50, such as hereinbefore described, are employed to lock the parts in position.

The bracket C of my improved connecter may be secured to the usual car coupler G in any desired manner, such as by a lug H and bolts 51, and any suitable means, such as wings or prongs 52, may be employed to align the coupling head A of my improved connecter with the opening head. The various members and parts of my improvement are, of course, so proportioned and arranged as to permit of proper assembly and operation.

What I claim is:

1. In an automatic train pipe connecter, the combination with a coupling head and a suitable support therefor, of a train pipe hose adapted to be connected into communication with said head and with the hose of an adjacent unequipped car, and a common means for effecting such connection, said means comprising a fitting carried at one end of said train pipe hose and rotatable relative thereto.

2. In an automatic train pipe connecter, the combination with a coupling head and a suitable support therefor, of a train pipe hose adapted to be connected into communication with said head and with the hose of an adjacent unequipped car, and a common means for effecting such connection, said means comprising a fitting carried at one end of said train pipe hose and requiring to be rotated relative thereto in connecting the train pipe hose from the automatic connecter to the hose of the unequipped car and from said last mentioned hose back to the automatic connecter.

3. In an automatic train pipe connecter, the combination with a coupling head and a suitable support therefor, of a train pipe hose adapted to be connected into communication with said head and with the hose of an adjacent unequipped car, and a common means for effecting such connection, said means comprising a fitting having the coupling contour of the standard hand operated hose coupling carried at one end of said train pipe hose and rotatable relative thereto.

4. In an automatic train pipe connecter, the combination with a coupling head and a suitable support therefor, of a train pipe hose adapted to be connected into communication with said head and with the hose of an adjacent unequipped car, and a common means for effecting such connection, said means comprising a fitting carried at one end of said train pipe hose and provided with a fluid tight swivel joint for permitting rotation of said fitting relative to said train pipe hose.

5. In an automatic train pipe connecter, the combination with a coupling head and a suitable support therefor, of a train pipe hose adapted to be connected into communication with said head and with the hose of an adjacent unequipped car, a common means for effecting such connection, said means comprising a fitting carried at one end of said train pipe hose and rotatable relative thereto, and means for locking said fitting in the service position with respect to said coupling head.

6. In an automatic train pipe connecter, the combination with a coupling head and a suitable support therefor, of a train pipe hose adapted to be connected into communication with said head and with the hose of an unequipped car, a common means for effecting such connection comprising a fitting carried at one end of said train pipe hose and being rotatable relative thereto, and means for positioning said fitting with respect to said head and for locking the fitting in such position.

7. In an automatic train pipe connecter, the combination with a coupling head and a suitable support therefor, of a train pipe hose adapted to be connected into communication with said head and with the hose of an adjacent unequipped car, a common means for effecting such connection comprising a fitting carried at one end of said train pipe hose and being rotatable relative thereto, and means for guiding said fitting into service position, and means for maintaining the fitting in such position.

8. In an automatic train pipe connecter, the combination with a coupling head and a suitable support therefor, of a train pipe hose adapted to be connected into communication with said head and with the hose of an adjacent unequipped car, a common means for effecting such connection comprising a fitting carried at one end of said train pipe hose and rotatable relative thereto, means for guiding said fitting into the service position, and manually operated cam means for locking the fitting in such position.

9. In an automatic train pipe connecter, the combination with a coupling head and a suitable support therefor, of a train pipe hose adapted to be connected into communication with said head and with the hose of an adjacent unequipped car, a common means for effecting such connection comprising a fitting carried at one end of said train pipe hose and being rotatable relative thereto, means for positioning said fitting with respect to said coupling head, and means for maintaining said positioning means in the service position to prevent undesired movement of said fitting.

10. In an automatic train pipe connecter, the combination of a coupling head, a support therefor, a conduit extending into said head, means for maintaining said conduit in position with respect to the head, a train pipe hose adapted to be connected into communication with said conduit and with the hose of an unequipped car, means for effecting such connection comprising a fitting having the coupling contour of a standard hand operated hose coupling rotatably carried at one end of said train pipe hose and operating to make a butt joint with said conduit.

11. In an automatic train pipe connecter, the combination of a perforated coupling head, a supporting member therefor, a conduit projecting into the perforation in said head and having a rear face, an interchange coupling provided with a gasket aligning with the opening in said conduit and abutting said rear face, and clamping means mounted on said supporting member for forcing said gasket against said conduit to form a fluid tight joint between the gasket and said rear face.

12. In an automatic train pipe connecter, the combination of a perforated coupling head, a supporting member therefor, a conduit projecting into the perforation in said head and having a rear face, an interchange coupling abutting the rear face of said conduit, means mounted on said supporting member for forcing said interchange coupling against the conduit, and a gasket to seal the joint between said conduit and said interchange coupling, said gasket being pressed into tight engagement with the conduit by the fluid pressure therein.

13. In an automatic train pipe connecter, the combination with a coupling head suitably supported from a car, of a member extending rearwardly away from said head and comprising spaced portions, a conduit positioned between said portions and extending into said head, an interchange device adapted to be inserted between said portions, means on said member to guide said interchange device into position with respect to said conduit, and means connecting said interchange device with the train pipe of the car.

14. In an automatic train pipe connecter, the combination with a perforated coupling head and a suitable support therefor, of a conduit extending into said perforation, a gasket in said perforation, an interchange device abutting said conduit, and manually operated means co-operating with said interchange device to maintain said conduit in the service position whereby the conduit and said gasket may be removed and replaced while mated coupling heads remain coupled up in service.

15. In an automatic train pipe connecter, the combination with a coupling head and an interchange device for coupling the hose of the car equipped with said head into communication with said head, of a support for permitting free universal movement to said head, said support comprising a vertically extending member having a flared face adapted to receive the similarly shaped face of a co-operating member whereby said coupling head may be shifted from the normal coupling position to permit said interchange device being coupled across to the hose of an unequipped car.

16. In an automatic train pipe connecter, the combination with a coupling head and an interchange device for coupling the hose of the car equipped with said head into communication with said head, of a yieldable support for the head, said support comprising a bracket having at its lower end a non-circular projection, a pivot device pivotably mounted upon said projection whereby said coupling head may be rotated around said projection out of the normal coupling position to permit said interchange device to be coupled to the hose of an unequipped car, and means for maintaining said coupling head in said rotated position.

17. In an automatic train pipe connecter, the combination with a coupling head and an interchange device for coupling the hose of the car equipped with said head into communication with said head, of a yieldable support for the head, said support comprising a bracket having at its lower end a projection, a pivot device pivotably mounted upon said projection whereby said coupling head may be rotated around said projection out of the normal coupling position to permit said interchange device to be coupled to the hose of an unequipped car, and means for yieldingly maintaining said coupling head in said rotated position.

18. In an automatic train pipe connecter, the combination with a coupling head and an interchange device for coupling the hose of the car equipped with said head into communication with said head, of a support for permitting free universal movement to said head, said support comprising a spring and co-operating cam members adapted to compress said spring to permit said coupling head to be shifted from the normal uncoupled position to allow said interchange device to be coupled across to the hose of an unequipped car.

19. In an automatic train pipe connecter, a coupling head, a bracket, a member connected to said head and supported on said bracket, said bracket having a non-circular portion at its lower end, said member having a portion adapted to bear against the non-circular portion of said bracket, said member being rotatable about said non-circular portion of the bracket, a coiled spring for forcing said member against the non-circular portion of the bracket, whereby said member and head may be maintained in normal coupled position or moved out of such position, a flexible train pipe hose, means on said hose for detachably connecting the same to said coupling head when the latter is in normal coupling position, and for detachably connecting the same to a similar hose on an adjacent car when said head is moved out of normal coupling position.

In testimony whereof I affix my signature.

JOSEPH ROBINSON.